Sept. 8, 1925.

O. D. WILLIS

CAR BRAKE RATCHET

Filed Jan. 15, 1925

WITNESSES

INVENTOR
O. D. WILLIS,
BY
ATTORNEYS

Patented Sept. 8, 1925.

1,553,278

UNITED STATES PATENT OFFICE.

OSCAR DILLMONT WILLIS, OF HUNTINGTON, WEST VIRGINIA.

CAR-BRAKE RATCHET.

Application filed January 15, 1925. Serial No. 2,647.

*To all whom it may concern:*

Be it known that I, OSCAR D. WILLIS, a citizen of the United States, and a resident of Huntington, in the county of Cabell and State of West Virginia, have invented certain new and useful Improvements in Car-Brake Ratchets, of which the following is a specification.

My present invention relates generally to ratchet controlling devices, and more particularly to such devices used in connection with railway freight cars, especially box cars for the purpose of controlling the car brakes, and the object of my invention is the provision of a brake control ratchet mechanism which will be speedy in action, strong and durable in its construction, and inexpensive in its nature. A further object is the provision of a car brake ratchet having means whereby the release of the ratchet may be controlled from the operating hand lever together with supplemental means to assist in the releasing action when the tension on the ratchet wheel is so great as to prevent release in the ordinary manner and a still further object is the provision of a car brake ratchet whose construction avoids the using of springs and other parts likely to be adversely effected by weather and climatic conditions.

In the accompanying drawings which illustrate my present invention and forms a part of this specification—

Figure 4 is a side view, the frame being partly broken away and in section, and

Figure 5 is a detailed perspective view of certain parts in detached relation.

Figure 1:
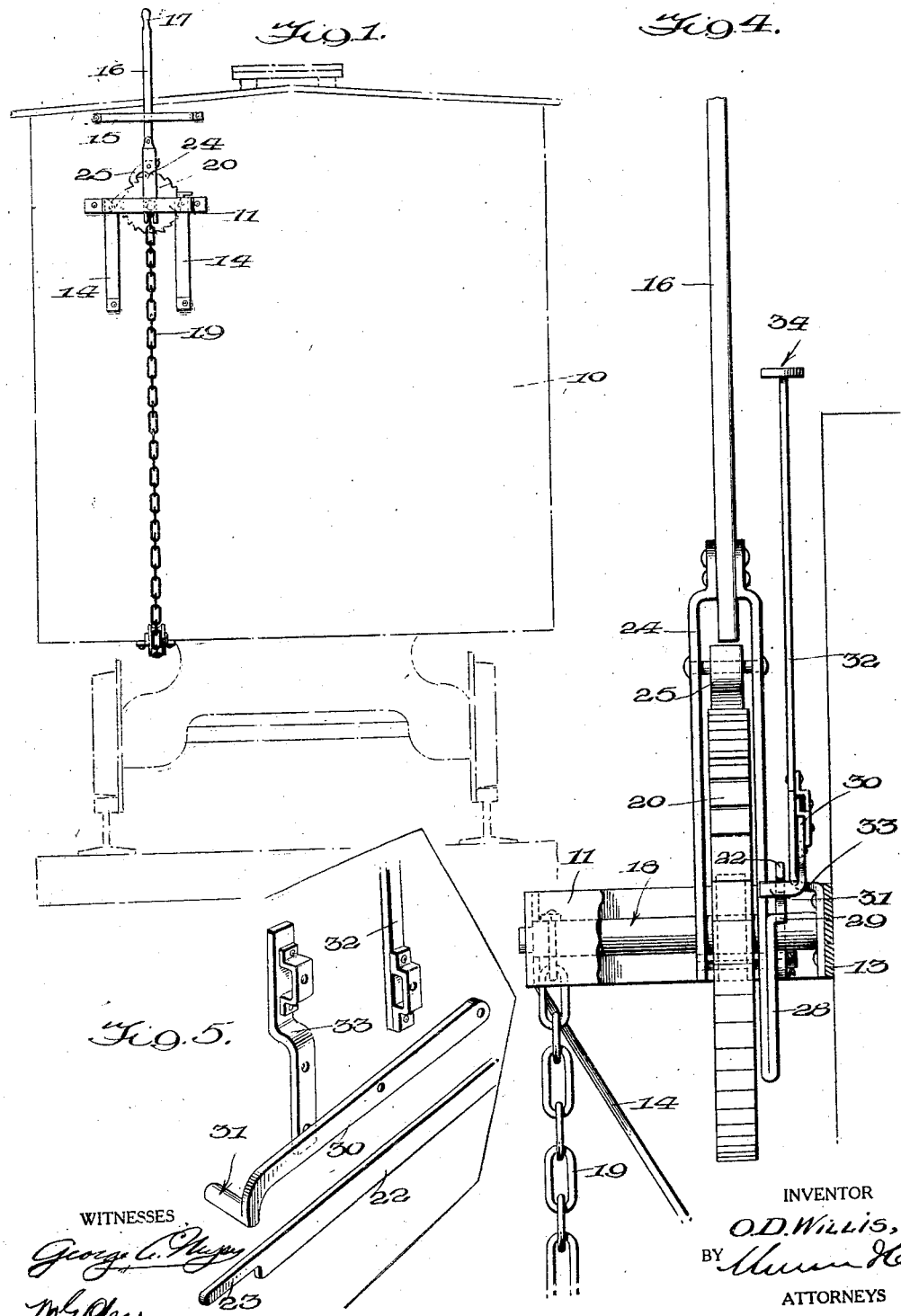
Figure 1 is an elevation looking at the end of a box car showing the same equipped with my improvements.

Referring now to these figures, my invention proposes a ratchet mechanism including a frame mounted horizontally at one end of a box car and generally indicated at 10 in Figure 1, this frame including an outer U-shaped portion 11, the rear ends of whose extensions are outturned as at 12 and secured to the ends of a rear frame bar 13, the latter being directly connected to the car body. The frame thus constituted, is braced and supported by inclined braces 14 and is positioned below a guide bracket 15 upwardly through which the main ratchet lever 16 projects, with its handle 17 extending above the top of the car.

The frame just above described supports a winding shaft 18 having bearings at its ends in approximately the central portions of the frame 11 and the rear frame bar 13. To this shaft adjacent to its outer end is secured the uper end of the brake operating chain 19 and to the shaft adjacent to the inner end thereof is securely fastened the ratchet wheel 20, this ratchet wheel being engaged at one side by a locking detent 21 having in connection therewith a releasing arm 22 which extends across the rear face of the ratchet wheel 20 above the shaft 18 and has a reduced free end 23.

The lower forks 24 of the main ratchet lever 16 straddle the ratchet wheel, and between the upper portions of these forks a pawl 25 is pivoted, this pawl having an angular engaging nose 26 which falls by gravity into the teeth of the ratchet wheel 20. At its other end the pawl 25 has a short projecting nose 27 adjacent to the lower extremity of the lever 16 between the forks 24 so that when the lever 16 is raised the nose 27 will prevent the pawl 25 from dropping to a vertical position.

Figure 2:
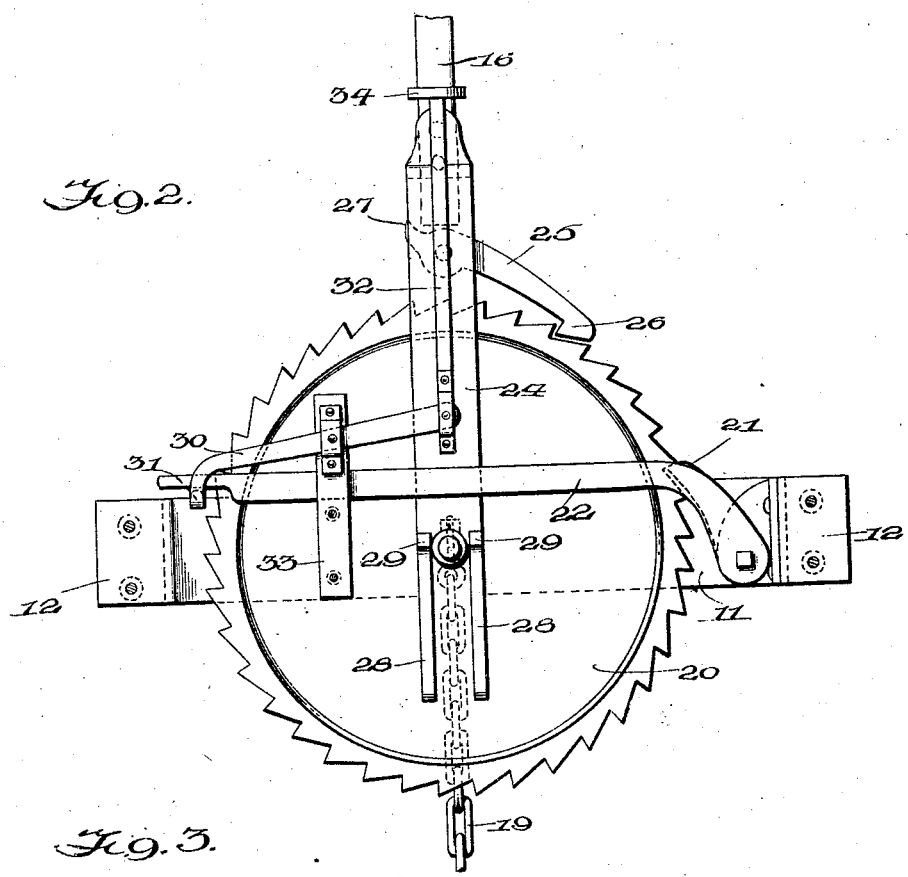
Figure 2 is a rear view of my improved ratchet mechanism with the rear frame bar removed.
Figure 3:
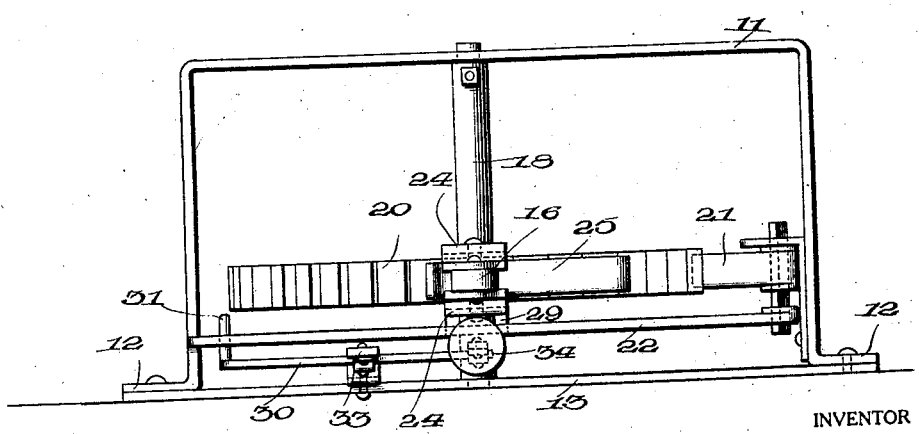
Figure 3 is a top plan view thereof.

The lower ends of the forks 24 are slotted so as to fit downwardly over the shaft 18 and permit the lever 16 to be oscillated with the shaft as its fulcrum point and to be also raised and lowered with respect to the shaft. One of the forks 24 at the rear side of the ratchet wheel 20 has extensions 28 bent upwardly therealong at the sides of its lower slot, with their upper ends angularly outstanding as at 29 below the detent releasing arm 30 as will be plainly seen by reference to Figures 2 and 4.

Thus the lever 16 is oscillated back and forth in the operation of rotating the ratchet wheel 20 to turn the shaft 18 and wind the chain 19 thereon, the pawl 25 forcing rotation of the ratchet wheel when the lever 16 is moved to the right in Figure 1 and the detent 21 holding the ratchet wheel against reverse rotation when the lever is brought back for another effective stroke.

In releasing the ratchet wheel for rotation so that the chain 19 may unwind from the shaft 18 it is simply necessary to grasp the lever 16 and lift the same with respect to the shaft and ratchet wheel, during which movement the upper angular extensions 29 before mentioned will engage the detent releasing arm 22 and elevate the latter so as to swing the detent 21 out of engagement with the ratchet wheel, this releasing of the detent 21 taking place just after the lifting of the pawl 25 entirely free of the teeth of the ratchet wheel.

In some instances, however, the tension of the brake connections through the chain 19 is so great as to prevent ready release of the pawl 25 and detent 21 from the ratchet wheel and it is for this reason my invention provides supplemental means in the nature of a lever 30 having an angular extension 31 at its free end beneath the reduced free end 23 of the releasing arm 22, and an upright treadle 32 whose lower end is pivotally connected to the other end of lever 30. The lever 30 is intermediately fulcrumed within a bearing bracket 33 secured to an upstanding from the rear frame bar 13 and thus when the operator presses downwardly upon the treadle 32, placing his foot upon the upper foot plate 34 of the treadle for this purpose, lever 30 will be rocked on its fulcrum and its outer end elevated, its angular extension 31 engaging the free end of the detent releasing arm 22. At the same time the operator shifts the lever 16 slightly to the right in Figure 1 a sufficient distance to relieve the tension against the detent 21 so that the latter is thus easily shifted free of the ratchet wheel and the operator then permits lever 16 to move to the end of its stroke in the opposite direction at which time the detent 21 is again permitted to engage the ratchet wheel.

Lever 16 is then shifted to the right in Figure 1 to the end of its stroke in that direction and the above is repeated until tension on the ratchet wheel has been sufficiently relieved to permit releasing the same by upward movement of the operating lever 16 as first above described.

It is thus obvious that my invention presents an effective, efficient car brake ratchet which will be strong and durable in use, inexpensive in first cost as well as upkeep and one which will be unlikely to be affected by climatic conditions and will be adaptable to easy manipulation at all times for either taking up or releasing purposes.

I claim:

1. In a car brake ratchet, a winding shaft, a ratchet wheel thereon, a detent engaging the ratchet wheel and having a releasing arm in connection therewith, an actuating lever having forks at one end straddling the ratchet wheel and in movable connection with the shaft for turning movement thereon and elevating movement with respect thereto, means carried by said lever to engage and raise the releasing arm when the lever is elevated, and means including a treadle at one side of the ratchet wheel for raising said releasing arm independent of the actuating lever as described.

2. In a car brake ratchet, a winding shaft, a ratchet wheel thereon, a detent engaging the ratchet wheel and having a releasing arm extending across one face of the ratchet wheel, an actuating lever having forks at one end straddling the ratchet wheel and slotted to receive the shaft whereby the lever may swing on the shaft and move longitudinally with respect thereto, and means carried by one of said forks to engage and raise the releasing arm when the lever is raised.

3. In a car brake ratchet, a winding shaft, a ratchet wheel thereon, a detent engaging the ratchet wheel and having a releasing arm extending across one face of the ratchet wheel, an actuating lever having forks at one end straddling the ratchet wheel and slotted to receive the shaft whereby the lever may swing on the shaft and move longitudinally with respect thereto, one of said forks having upturned extensions at opposite sides of its slot terminating in angularly outstanding lugs beneath the releasing arm.

4. In a car brake ratchet, a winding shaft, a ratchet wheel thereon, a detent engaging the ratchet wheel and having a releasing arm extending across one face of the ratchet wheel, an actuating lever having forks at one end straddling the ratchet wheel and slotted to receive the shaft whereby the lever may swing on the shaft and move longitudinally with respect thereto, and means carried by one of said forks to engage and raise the releasing arm when the lever is raised; a releasing lever fulcrumed adjacent to the ratchet wheel and having one angular end beneath the free end of the releasing arm; and a treadle pivotally connected at its lower end to the other end of said releasing lever.

OSCAR DILLMONT WILLIS.